United States Patent [19]

Luckett et al.

[11] Patent Number: 5,329,888
[45] Date of Patent: Jul. 19, 1994

[54] THERMOSTAT HOUSING ASSEMBLY FOR A MARINE ENGINE

[75] Inventors: Christopher J. Luckett; Bruce A. Schroeder; Norman W. Schweitz, all of Stillwater, Okla.

[73] Assignee: Brunswick Corporation, Lake Forest, Ill.

[21] Appl. No.: 104,379

[22] Filed: Aug. 9, 1993

[51] Int. Cl.⁵ .................................................. F01P 7/14
[52] U.S. Cl. .................................. 123/41.08; 236/34.5
[58] Field of Search ........................... 123/41.08, 41.09; 236/34.5

[56] References Cited

U.S. PATENT DOCUMENTS

| | | | |
|---|---|---|---|
| 2,471,533 | 5/1949 | Morgan | 236/34.5 |
| 4,991,546 | 2/1991 | Yoshimura | 123/41.09 |
| 5,121,787 | 1/1992 | Corbett | 164/235 |

*Primary Examiner*—Noah P. Kamen
*Attorney, Agent, or Firm*—Andrus, Sceales, Starke & Sawall

[57] ABSTRACT

A thermostat housing assembly for a marine engine having a first inlet to receive sea water and an outlet that is connected to a circulating pump that circulated cooling water to the engine. A baffle is located in the housing and prevents direct flow between the sea water inlet and the outlet. The housing defines a pair of passages with a first of the passages providing communication between the sea water inlet and forms a first chamber which communicates with a pair of manifold outlets that are connected to the manifold. A second of the passages provides communication between the sea water inlet and the outlet to the circulation pump. The housing also includes a return inlet for returning water from the engine and the return inlet is connected to the second passages. A thermostat is mounted in an opening between the passages and when the thermostat is open a portion of the returning cooling water will be directed through the thermostat opening to the first passage and mixed with incoming sea water and then directed to the manifolds.

14 Claims, 2 Drawing Sheets

THERMOSTAT HOUSING ASSEMBLY FOR A MARINE ENGINE

BACKGROUND OF THE INVENTION

In a conventional cooling system for an internal combustion engine, the coolant is circulated by a circulating pump through the engine block, through the cylinder heads and to the intake manifold. In an automobile or other land vehicle, the coolant flows from the manifold to the radiator. With a marine engine, which has no radiator, the coolant passing through the manifold is discharged overboard and make-up water is supplied by a seawater pump.

In the past, the thermostat of a marine engine was usually located in the intake manifold. When the engine is cold and the thermostat is closed, the water or coolant will not pass through the manifold, but a small portion of the water will flow through a bypass that returns to the circulating pump so that there is some water flow through the engine block.

It was believed in the past that it was desirable with a cold engine to heat the manifolds to reduce condensation and prevent any such condensation from flowing back into the cylinders. Thus, with the cooling systems of the past, the cooling water was not flowed through the manifolds until the engine was heated and the thermostat opened.

More recently a cooling system has been employed with marine engines utilizing a thermostat housing assembly such as that shown in U.S. Pat. No. 5,121,787. While that patent is directed specifically to an evaporable foam pattern for producing the thermostat housing, the cast housing is identical in configuration to that shown in the patent. With the construction shown in U.S. Pat. No. 5,121,787, the thermostat is located in a thermostat housing which is mounted to the engine block. As described in U.S. Pat. No. 5,121,787, sea water is pumped into an inlet in the thermostat housing and when the thermostat is closed, a portion of the incoming water is directed through a pair of outlets to exhaust elbows while a second portion of the incoming sea water is circulated through the engine block. When the thermostat is opened, a portion of the returning water in the circulating system will flow to the manifolds. With the arrangement as described in U.S. Pat. No. 5,121,787, no coolant is distributed to the manifolds until the engine warms and the thermostat is open.

SUMMARY OF THE INVENTION

The invention is directed to an improved thermostat housing assembly for a marine engine in which there is full flow of coolant to the manifolds at all times.

The thermostat housing assembly of the invention includes an outer housing or casing having a sea water inlet through which sea water is delivered to the housing. The housing also includes a circulating outlet which communicates with a circulating pump that circulates the water through the engine block, and the water is returned to the housing through a return inlet.

Located in the housing between the sea water inlet and the circulating outlet is a baffle which prevents direct flow between the inlet and the outlet. The baffle directs a first portion of the incoming sea water into a first chamber that communicates with a pair of outlets that are connected to the exhaust manifolds, and directs a second portion of the incoming sea water into a second chamber which communicates with the circulating outlet.

In addition, the housing is provided with an opening that establishes communication between the first and second chambers, and a thermostat is mounted in the opening. When the thermostat is closed, the returning coolant entering the return inlet will be directed into the second chamber and then to the circulating outlet. As the engine warms and the thermostat opens, a portion of the returning coolant will be directed through the open thermostat to the first chamber and mixed with the incoming sea water in the first chamber for delivery to the manifolds.

With the construction of the invention, there is a full circulation of coolant to the manifolds even when the thermostat is closed and the engine is cold.

The thermostat housing requires only five connections, i.e., a connection to the sea water inlet, a connection to the circulating outlet, a connection to the return inlet and a pair of connections to the manifolds, as compared with prior thermostat housings which also included connections to the exhaust elbows.

As a further advantage, the thermostat housing assembly of the invention does not require any check valves, as were required in prior thermostat housings in the lines to the exhaust elbows, to prevent heated water from being drawn back from the exhaust elbows rather than fresh water being drawn into the housing.

The thermostat housing of the invention is more compact than prior housings, and provides a low profile.

Other objects and advantages will appear during the course of the following description.

DESCRIPTION OF THE DRAWINGS

The drawings illustrate the best mode presently contemplated of carrying out the invention. In the drawings.

DESCRIPTION OF THE ILLUSTRATED EMBODIMENT

Figure 1:
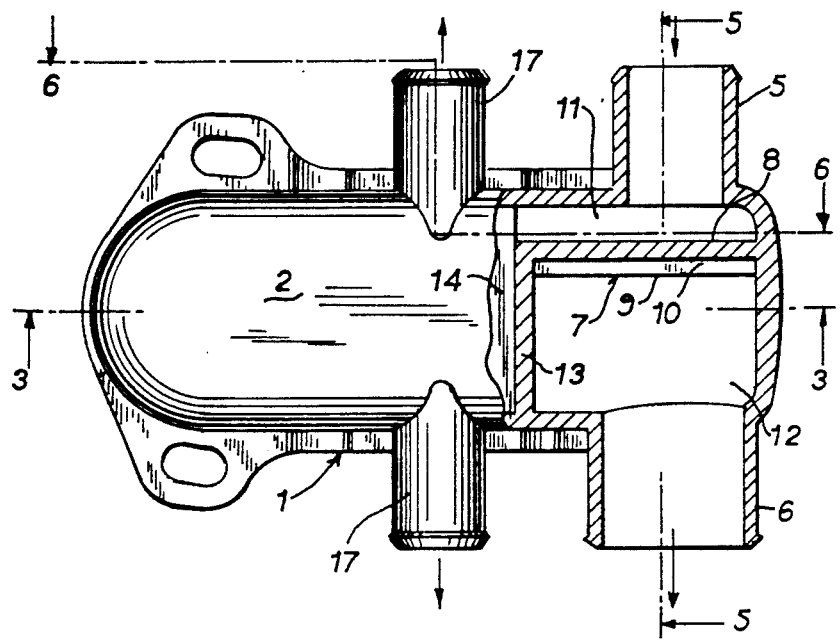
FIG. 1 is a plan view of the thermostat housing of the invention with parts broken away in section.
Figure 2:
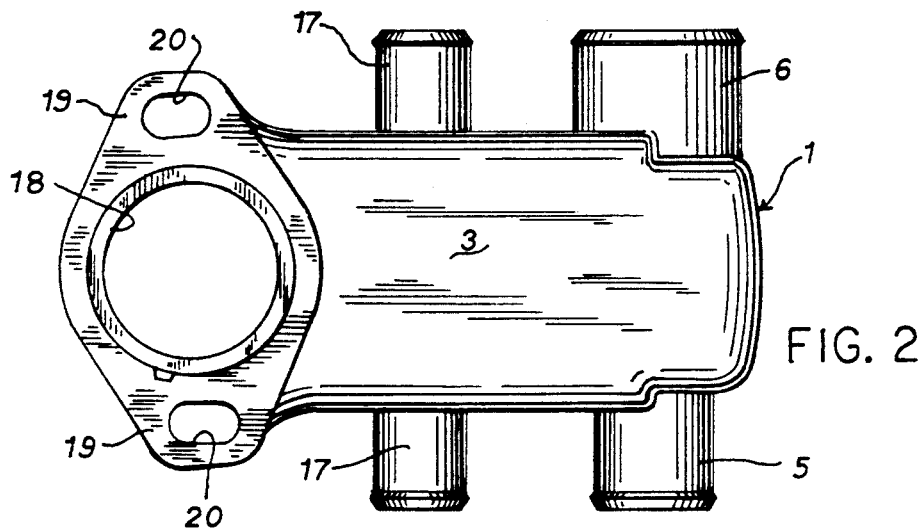
FIG. 2 is a bottom view of the thermostat housing.

The drawings illustrate a thermostat housing assembly for an internal combustion engine and in particular to a thermostat housing assembly to be employed with a four stroke marine engine.

The assembly includes a housing 1, preferably cast from a corrosion resistant material such as stainless steel, and the housing is formed with a generally flat upper surface 2 and a generally flat bottom surface 3 which are connected by a side wall 4.

Fresh sea water is introduced into the housing through a sea water inlet 5 in side wall 4 and inlet 5 is connected to a sea water pump, not shown. Located opposite the sea water inlet 5 in side wall 4 is circulating outlet 6 which is connected to a circulating pump. The pump distributes the coolant to the engine block and cylinder heads.

Figure 3:
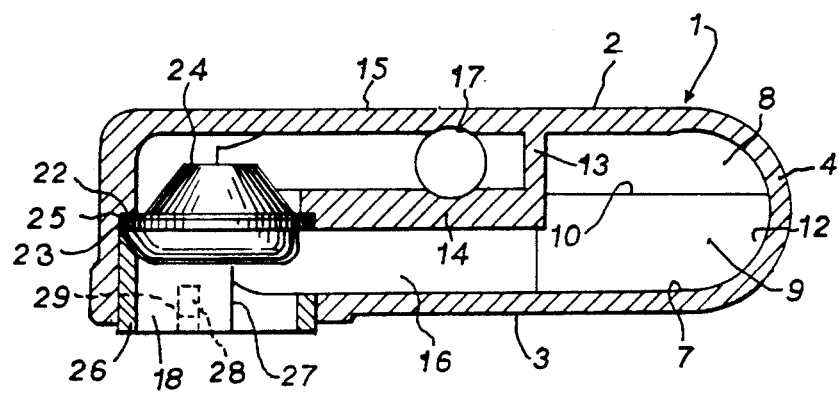
FIG. 3 is a section taken along line 3—3 of FIG. 1.
Figure 4:
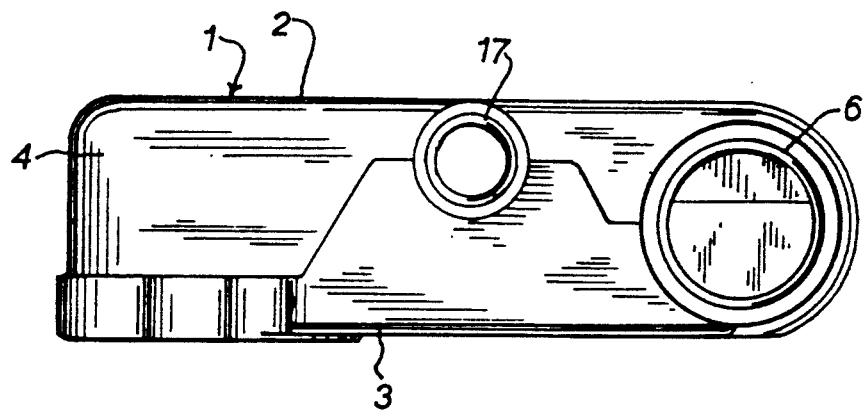
FIG. 4 is a side view of the housing.

Located within housing 1 is an internal wall or baffle 7 which extends between top wall 2 and bottom wall 3, as best illustrated in FIGS. 1 and 3. Baffle 7 is composed of an upper section 8 and a parallel lower section 9 which is connected to the lower edge of upper section 8 by an offset 10. Baffle 7 divides housing 1 into a first chamber 11 which communicates with the sea water inlet 5 and a second chamber 12 which communicates with the circulating outlet 6, as shown in FIG. 1. In addition, a wall 13 extends from the upper portion of baffle 7 to side wall 4. The space between the lower edge of wall 13 and bottom wall 3 provides an opening through which the coolant can flow from chamber 11 to chamber 12 and then to the outlet 6.

In addition, housing 1 is provided with a horizontal wall 14 which extends from vertical wall 13 to the opposite portion of side wall 4 and divides the housing into an upper passage 15 and a lower passage 16, as seen in FIG. 3. Both of the passages 15 and 16 communicate with chamber 11, but wall 13 prevents communication between passage 15 and chamber 12, although passage 16 communicates directly with the chamber 12.

A pair of outlets 17 are formed in upper passage 15 and outlets 17 are connected to the exhaust elbows and manifold of the engine.

The water or coolant, after being passed through the engine block and heads by the circulating pump, is returned to the housing 1 through a return inlet 18 located in bottom wall 3. Bottom wall 3 is provided with a pair of opposed outwardly extending flanges 19 containing mounting holes 20 through which the housing is mounted to the engine.

Horizontal wall 14 is formed with an opening which provides communication between passages 15 and 16. A ledge or shoulder 22 is machined in wall 14 bordering the opening and the annular flange 23 of a thermostat 24 bears against shoulder 22. A gasket 25 of resilient material is interposed between the flange 23 and shoulder 22, as illustrated in FIG. 3.

Figure 7:
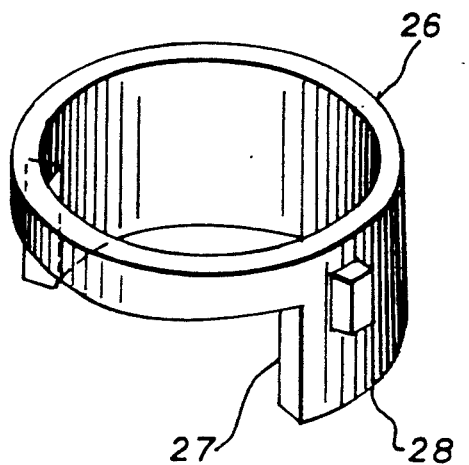
FIG. 7 is an inverted perspective view of the sleeve employed to retain the thermostat in the housing.

The thermostat flange 23 is held in contact with shoulder 22 by a sleeve 26, the configuration of which is best illustrated in FIG. 7. The upper partially circular edge of sleeve 26 bears against the thermostat flange 23, and the sleeve is provided with a cutout 27 which extends through an arc of approximately 150° to 160° and faces the passage 16.

To prevent rotation of sleeve 26 relative to the housing 1, a nib or projection 28 is formed on the outer surface of the sleeve and is engaged within a groove 29 in the housing.

Figure 5:
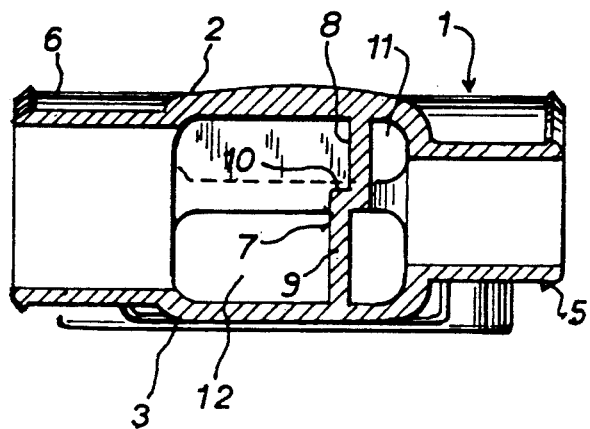
FIG. 5 is a section taken along line 5—5 of FIG. 1.
Figure 6:
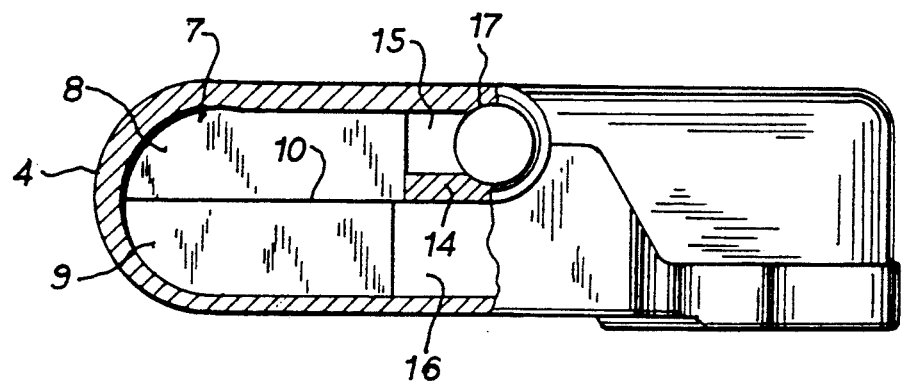
FIG. 6 is a section taken along line 6—6 of FIG. 1.

When the engine is cold and the thermostat is closed, sea water entering the inlet 5 will be directed by baffle 7 into the passages 15 and 16. As best illustrated in FIG. 5, the offset nature of the baffle 7 provides a greater volume of flow through passage 16 to outlet 6 than through passage 15 to the manifold outlets 17. The water being returned by the circulating pump to the housing through return inlet 18 will flow through passage 16 and back to the outlet 6 due to the fact that the thermostat 24 at this time is closed. Thus, when the thermostat is closed, there will be continuous circulation through outlets 17 to the manifolds as well as continuous circulation through the engine block.

As the engine warms and the thermostat opens, a portion of the returned heated water entering the return inlet 18 will flow through the open thermostat into passage 15 and mix with the cool sea water entering passage 15 from the inlet 5. The mixed-temperature water will then be discharged through the manifold outlets 17 to the exhaust manifolds and then overboard in the exhaust of the engine. Thus, with the thermostat open, a portion of the heated water being returned from the engine block will be discharged through the outlets 17 to the manifolds and then overboard.

With the construction of the invention there is full circulation to the manifolds at all times, even when the engine is cold and the thermostat is closed.

The thermostat housing construction of the invention is simplified in that the housing only includes two outlets to the manifolds as opposed to prior constructions which included outlets to the manifolds as well as outlets to the exhaust elbows. As there are no outlets to the exhaust elbows, the need for check valves in the exhaust elbow conduits, to prevent heated water from being drawn back into the housing, is correspondingly eliminated.

The thermostat housing is of compact size and has a low profile, and as it is constructed of stainless steel, it will withstand corrosion in salt water.

Various modes of carrying out the invention are contemplated as being within the scope of the following claims, particularly pointing out and distinctly claiming the subject matter which is regarded as the invention.

We claim:

1. A thermostat housing for an internal combustion engine, comprising a housing, first inlet means in the housing for introducing coolant to the housing, first outlet means in the housing and connected to a circulating pump for circulating coolant to the engine, baffle means in the housing for preventing direct flow of coolant from said first inlet means to said first outlet means, first passage means in the housing and communicating with said first inlet means, a pair of manifold outlets connected to said first passage means for supplying coolant from said first passage means to the manifolds of the engine, second passage means providing communication between said first inlet means and said first outlet means, return inlet means in said housing for returning coolant from the engine to the second passage means, a thermostat opening providing communication between the first passage means and the second passage means, and a thermostat mounted in said opening to control the flow of coolant therethrough, whereby when the thermostat is closed, a portion of the coolant entering said first inlet means will flow to said first passage means and then to said manifold outlets and a second portion of said coolant entering said first inlet means will flow through said second passage means to said first outlet means and coolant returning to the housing through said return inlet means will flow through said second passage means and to said first outlet means, and whereby opening of said thermostat results in a portion of the coolant returning to the housing through said return inlet means flowing through said thermostat opening to said first passage means and then to said manifold outlets.

2. The housing of claim 1, wherein said second passage means has a larger cross-sectional area than said first passage means, whereby the volume of flow of coolant through said second passage means will be greater than the volume of flow through said first passage means.

3. The housing of claim 1, wherein said housing includes a pair of generally parallel outer walls and a side wall connecting said outer walls, said baffle means extending between said outer walls.

4. The housing of claim 3, wherein said first inlet means and said first outlet means are in general axial alignment and said baffle means is disposed generally normal to the axes of said first inlet means and said first outlet means.

5. The housing of claim 4, wherein said baffle means includes a pair of offset parallel baffle sections, a first of said baffle sections being spaced a lesser distance from said first inlet means than a second baffle section, the space between said first baffle section and the housing communicating with said first passage means and the space between said second baffle section and said housing communicating with said second passage means.

6. The housing of claim 3 and including an internal wall disposed generally parallel to said outer walls and defining said first and second passage means.

7. The housing of claim 6, wherein said return inlet means is disposed in one of said outer walls.

8. A thermostat housing construction, comprising a housing composed of a pair of generally parallel flat outer walls and a side wall connecting the peripheral edges of said outer walls, first inlet means in the side wall for introducing coolant to said housing, first outlet means in the side wall and disposed in general alignment with said first inlet means for discharging coolant to a circulating system of the engine, a baffle disposed in the housing and extending between said outer walls and spaced from said first inlet means and from said first outlet means and dividing said housing into a first chamber communicating with said first inlet means and a second chamber located on the opposite side of said baffle from said first chamber and communicating with said first outlet means, an internal wall disposed in generally parallel spaced relation to said outer walls and defining a first passage and a second passage, said first passage communicating with said first chamber and said second passage communicating with said second chamber, said first and second passages being constructed such that said second passage is capable of conducting a greater volume of coolant than said first passage, a pair of manifold outlets connected to said first passage for supplying coolant from said first passage to the manifolds of the engine, return inlet means disposed in said housing and communicating with said second passage for returning coolant to said housing, said internal wall having an aperture providing communication between said first passage and said second passage, and a thermostat mounted in said aperture, when said thermostat is closed a first portion of coolant entering said first inlet means being directed from said first chamber into said first passage and discharged through said manifold outlets and a second portion of coolant being directed from said first chamber to said second passage and through said first outlet means and said coolant then being returned through said second inlet means to said second passage, opening of said thermostat resulting in a portion of the returning coolant being directed through said aperture to said first passage and then to said manifold outlets.

9. The construction of claim 8, wherein the manifold outlets are located in opposite portions of said side wall, and the axes of said manifold outlets are in alignment.

10. The construction of claim 8 and including a shoulder bordering said aperture, said thermostat having a peripheral flange engaged with said shoulder.

11. The construction of claim 10 and including a sleeve having an end engaged with the flange of said thermostat, said sleeve having a lateral opening communicating with said second passage.

12. The construction of claim 11 and including means for preventing rotation of said sleeve relative to said housing.

13. The construction of claim 12, wherein said means for preventing rotation comprises a projection on said sleeve and a groove in said housing to receive said projection.

14. The construction of claim 8, wherein said baffle comprises a pair of parallel offset baffle sections, a first of said baffle sections being spaced a lesser distance from said first inlet means than a second of said baffle sections.

* * * * *